United States Patent
Tsuyuzaki et al.

(10) Patent No.: US 10,850,597 B2
(45) Date of Patent: Dec. 1, 2020

(54) VEHICLE BODY LOWER STRUCTURE

(71) Applicant: HONDA MOTOR CO., LTD., Tokyo (JP)

(72) Inventors: Takumi Tsuyuzaki, Wako (JP); Hiroyuki Ozawa, Wako (JP); Ryo Shinoda, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/413,695

(22) Filed: May 16, 2019

(65) Prior Publication Data

US 2019/0359047 A1    Nov. 28, 2019

(30) Foreign Application Priority Data

May 25, 2018   (JP) ................................ 2018-100967

(51) Int. Cl.
| | | |
|---|---|---|
| *B60K 1/04* | (2019.01) | |
| *B62D 25/20* | (2006.01) | |
| *B60R 13/08* | (2006.01) | |
| *B62D 25/02* | (2006.01) | |

(52) U.S. Cl.
CPC ............ *B60K 1/04* (2013.01); *B60R 13/0861* (2013.01); *B62D 25/025* (2013.01); *B62D 25/2036* (2013.01); *B60K 2001/0416* (2013.01); *B60K 2001/0438* (2013.01)

(58) Field of Classification Search
CPC ............ B60K 1/04; B60K 11/04; B60K 11/00
See application file for complete search history.

(56) References Cited

U.S. PATENT DOCUMENTS

| | | | | |
|---|---|---|---|---|
| 2005/0121997 A1* | 6/2005 | Mae | ........................ | B62D 21/15 310/311 |
| 2012/0129029 A1* | 5/2012 | Yi | ............................ | B60K 1/04 429/100 |

FOREIGN PATENT DOCUMENTS

| | | |
|---|---|---|
| JP | 2013-028193 | 2/2013 |
| JP | 2013-129391 | 7/2013 |
| JP | 2015-150927 | 8/2015 |
| JP | 2016-100291 | 5/2016 |

OTHER PUBLICATIONS

Japanese Office Action for Japanese Patent Application No. 2018-100967 dated Nov. 5, 2019.

* cited by examiner

*Primary Examiner* — John D Walters
*Assistant Examiner* — James J Triggs
(74) *Attorney, Agent, or Firm* — Amin, Turocy & Watson, LLP

(57) ABSTRACT

A vehicle body lower structure includes: a battery pack provided below a floor panel and in which a cell is received in an inside of a case; a side frame extending in a vehicle body forward/rearward direction at an outer side of the battery pack in a vehicle width direction and configured to support the battery pack; and a support bracket having a first extension section that is fixed to the cell and that is disposed at an inner side in the vehicle width direction, and a second extension section that is fixed to a longitudinal wall section of the case and that is disposed at an outer side in the vehicle width direction, wherein the second extension section extends in an upward/downward direction at an inner side of the side frame in the vehicle width direction.

7 Claims, 11 Drawing Sheets

VEHICLE BODY LOWER STRUCTURE

CROSS-REFERENCE TO RELATED APPLICATION

Priority is claimed on Japanese Patent Application No. 2018-100967, filed May 25, 2018, the content of which is incorporated herein by reference.

BACKGROUND OF THE INVENTION

Field of the Invention

The present invention relates to a vehicle body lower structure.

Description of Related Art

In a vehicle body lower structure, a configuration in which a floor panel is provided between left and right rockers (hereinafter, referred to as left and right side sills) and a battery pack is disposed below the floor panel is known. In the battery pack, a battery (a plurality of cells) is accommodated in an inside of a battery case. The battery pack is attached to a left side sill via a left side frame, and attached to a right side sill via a right side frame (for example, see Japanese Unexamined Patent Application, First Publication No. 2013-28193).

SUMMARY OF THE INVENTION

In this way, in the vehicle body lower structure disclosed in Japanese Unexamined Patent Application, First Publication No. 2013-28193, the battery pack is attached to the left side sill via the left side frame, and attached to the right side frame via the right side sill. Accordingly, for example, it is conceivable that vibrations generated during traveling of a vehicle will be transmitted to the battery in the battery pack.

In addition, in the battery pack disclosed in Japanese Unexamined Patent Application, First Publication No. 2013-28193, for example, the battery accommodated in the battery case is not fixed to a side surface of the battery case. For this reason, it is considered that vibrations occur in the battery during traveling of the vehicle.

An aspect of the present invention is directed to providing a vehicle body lower structure capable of minimizing vibrations of a battery, for example, during traveling of a vehicle.

(1) A vehicle body lower structure according to the present invention includes a battery pack provided below a floor panel and in which a cell is accommodated in an inside of a case; a side frame extending in a vehicle body forward/rearward direction at an outer side of the battery pack in a vehicle width direction and configured to support the battery pack; and a support bracket having a first extension section that is fixed to the cell and that is disposed at an inner side in the vehicle width direction, and a second extension section that is fixed to a longitudinal wall section of the case and that is disposed at an outer side in the vehicle width direction, wherein the second extension section extends in an upward/downward direction at an inner side of the side frame in the vehicle width direction.

According to the aspect of the above-mentioned (1), the first extension section of the support bracket is fixed to the cell, and the second extension section is fixed to the longitudinal wall section (the sidewall section) of the case. Accordingly, for example, vibrations applied to the cell during traveling of the vehicle can be transmitted to the case via the support bracket. Accordingly, for example, during traveling of the vehicle, vibrations of the cell (i.e., the battery) inside the case can be minimized.

In addition, since the first extension section of the support bracket is fixed to the cell and the second extension section is fixed to the longitudinal wall section (the sidewall section) of the case, an attachment strength of the cell can be improved.

Further, the second extension section of the support bracket is provided at an inner side of the side frames in the vehicle width direction. In addition, the second extension section is made to extend in the upward/downward direction. Accordingly, when an impact load is input from a side of the vehicle body due to a side collision, a displacement amount of the side frame displaced toward the cell can be minimized by the support bracket.

That is, support rigidity of the cell can be increased by the support bracket, and the cell can be appropriately protected from an impact load due to a side collision.

(2) In the aspect of the above-mentioned (1), the support bracket may have a weak section provided in the second extension section.

According to the aspect of the above-mentioned (2), since the weak section is provided in the second extension section of the support bracket, when an impact load is input from a side of the vehicle body due to a side collision, the second extension section can be easily crushed. Accordingly, since the second extension section is appropriately crushed by an impact load input from a side of the vehicle, the impact load can be absorbed by the second extension section.

(3) In the aspect of the above-mentioned (2), the weak section may be formed of a bead extending in the upward/downward direction.

According to the aspect of the above-mentioned (3), since the weak section is formed of the bead extending in the upward/downward direction, the weak section can be formed to be appropriately crushed by the impact load from a side in the vehicle width direction. Accordingly, when an impact load is input from a side of the vehicle body due to a side collision, the weak section (i.e., the second extension section) can be appropriately crushed. Accordingly, the impact load due to the side collision can be appropriately absorbed by the second extension section.

In addition, since the weak section is formed of the bead extending in the upward/downward direction, rigidity of the weak section can be improved with respect to vertical vibrations by the cell (i.e., the battery). Accordingly, for example, vibrations in the upward/downward direction applied to the cell (the battery) during traveling of the vehicle can be appropriately transmitted to the case via the support bracket. Accordingly, vibrations of the cell (i.e., the battery) inside the case can be appropriately minimized.

(4) In the aspect of any one of the above-mentioned (1) to (3), a plurality of cross members that extend in the vehicle width direction at inside of the case and in which outer end portions in the vehicle width direction are fixed to the case may be provided, and the support bracket may be provided between the plurality of cross members in the vehicle body forward/rearward direction.

According to the aspect of the above-mentioned (4), the support bracket is provided between the plurality of cross members in the vehicle body forward/rearward direction.

Accordingly, since a portion of the case between the cross members is reinforced by the support bracket, rigidity of the portion between the cross members can be secured. The number of the cross members in the case can be minimized to a low level, and a large space in the case can be secured.

Accordingly, strength with respect to the impact load due to a side collision can be improved at a position where the cross members are not provided, without decreasing the number of the cells received in the case.

(5) In the aspect of any one of the above-mentioned (1) to (4), a cross member that extends in the vehicle width direction at inside of the case and in which an outer end portion in the vehicle width direction is fixed to the case may be provided, the cross member may be constituted by at least two members including a first cross member and a second cross member, and the second cross member extending further outward in the vehicle width direction than the first cross member may be fixed to a longitudinal wall section of the case.

According to the aspect of the above-mentioned (5), the cross member is constituted by the first cross member and the second cross member.

Further, the second cross member extends further outward in the vehicle width direction than the first cross member, and only the second cross member is fixed to the longitudinal wall section (i.e., the sidewall section) of the case. Accordingly, in comparison with the case in which the two members of the first cross member and the second cross member are fixed to the longitudinal wall section of the case, the cross members can be appropriately crushed by the impact load due to the side collision. Accordingly, the impact load due to the side collision can be appropriately absorbed by the cross members.

In addition, for example, when an excessive impact load is input from a side of the vehicle body due to the side collision, deformation (displacement) of the longitudinal wall section of the case can be minimized by the first cross member. Accordingly, deformation (displacement) of the cell (i.e., the battery) received in the case can be minimized.

(6) In the aspect of the above-mentioned (5), the first cross member may have a higher strength than that of the second cross member.

According to the present invention, the strength of the first cross member is higher than that of the second cross member. That is, the second cross member can be more appropriately easily crushed than the first cross member. Accordingly, the second cross member can be appropriately crushed by an impact load input from a side of the vehicle body due to the side collision, and an appropriate crush amount (i.e., a collision stroke) of the second cross member can be secured by the first cross member. Accordingly, the impact load due to the side collision can be appropriately absorbed, and the impact load cannot be transmitted to the cell (i.e., the battery). That is, the cell (i.e., the battery) can be protected from the impact load due to the side collision.

(7) In the aspect of the above-mentioned (5) or (6), the second cross member may have a cross member weak section provided on an outer end portion side in the vehicle width direction.

According to the aspect of the above-mentioned (7), when the cross member weak section is provided on an outer end portion side of the second cross member in the vehicle width direction, the second cross member can be actively (i.e., more appropriately) easily crushed by the impact load input from a side of the vehicle body due to the side collision. Accordingly, a crush amount (i.e., a collision stroke) of the second cross member can be more appropriately secured. Accordingly, the cell (i.e., the battery) can be more appropriately protected from the impact load due to the side collision.

According to the aspect of the present invention, the first extension section of the support bracket is fixed to the cell, and the second extension section is fixed to the longitudinal wall section of the case. Accordingly, for example, vibrations of the battery during traveling of the vehicle can be minimized.

DETAILED DESCRIPTION OF THE INVENTION

Figure 1:
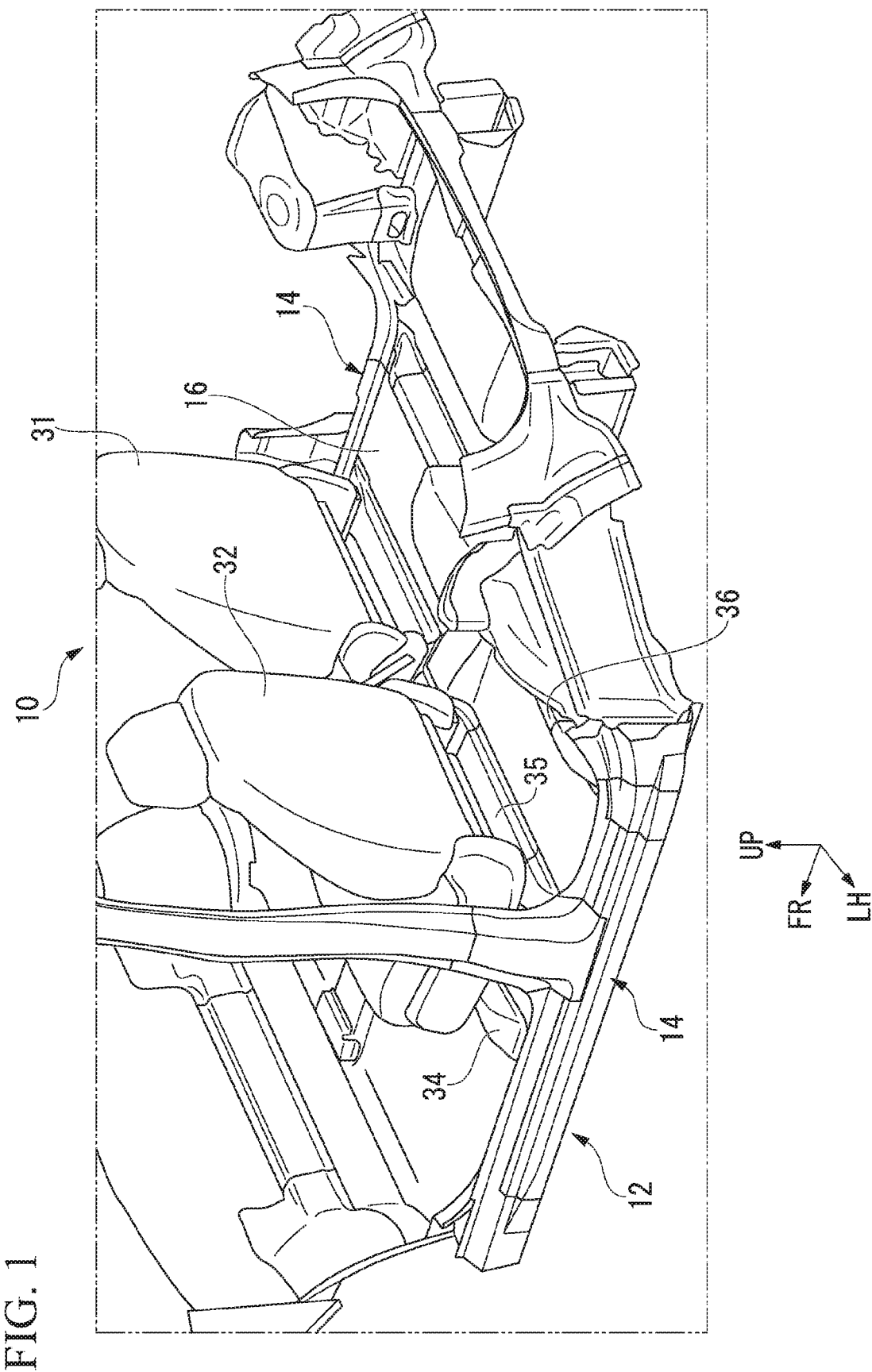
FIG. 1 is a perspective view showing a state in which a vehicle according to an embodiment of the present invention is seen from above and from a left diagonal side of a rear section.

Hereinafter, an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle.

Figure 2:
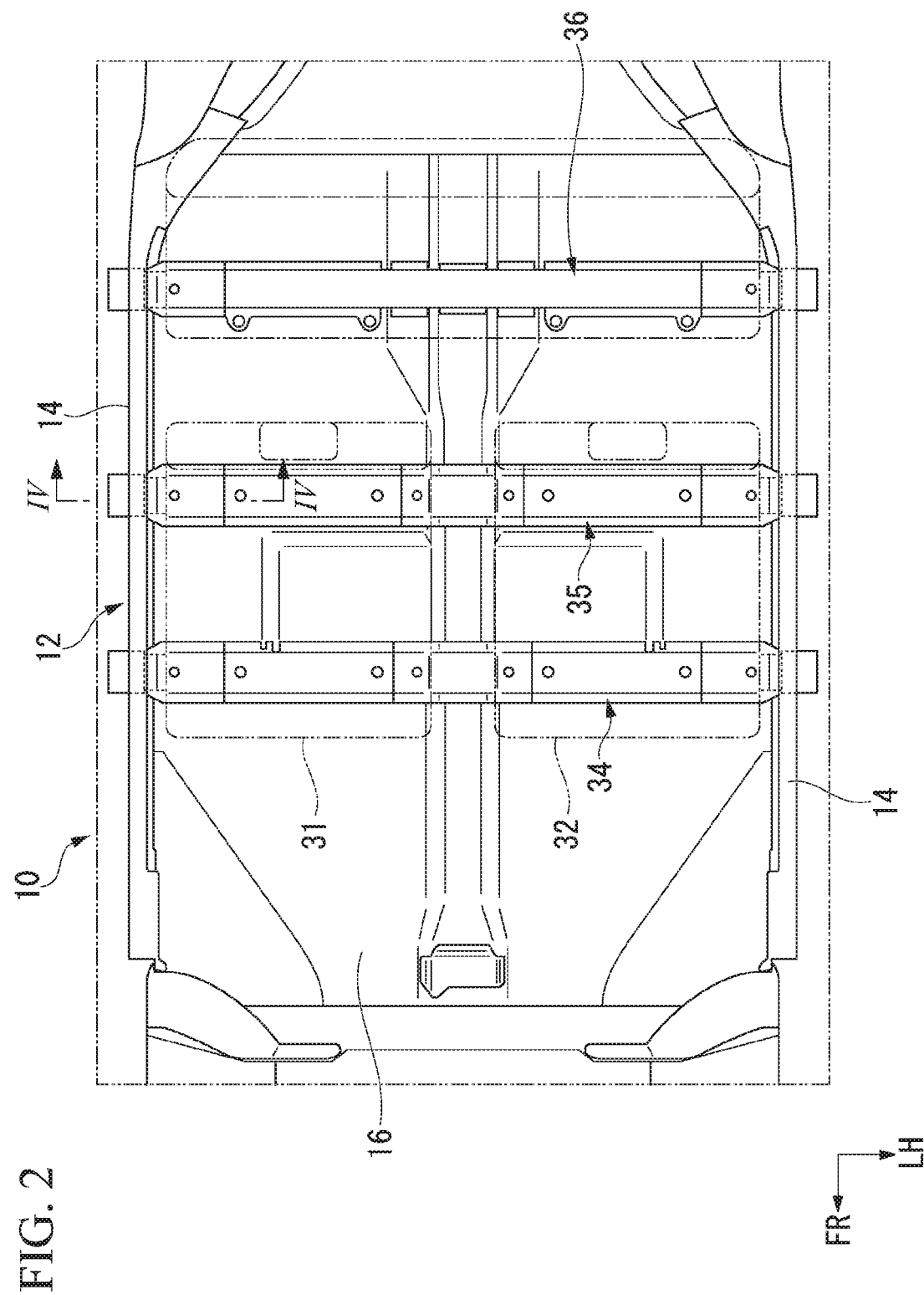
FIG. 2 is a plan view showing a vehicle body lower structure of the vehicle according to the embodiment of the present invention.
Figure 3:
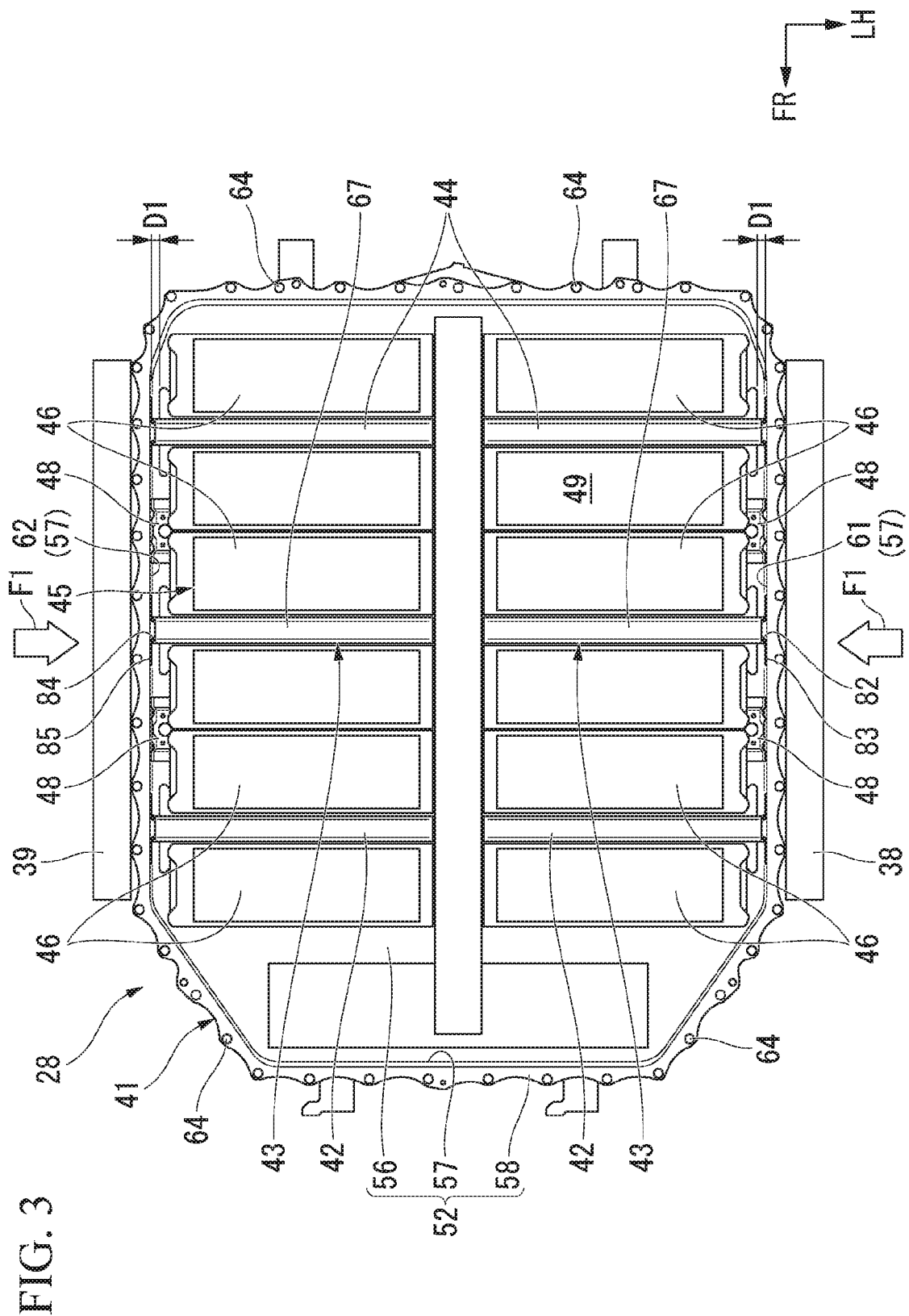
FIG. 3 is a plan view showing a state in which a case cover is removed from a battery pack of the vehicle body lower structure according to the embodiment of the present invention.

FIG. 1 is a perspective view showing a state in which a vehicle 10 according to an embodiment of the present invention is seen from above and from a left diagonal side of a rear section. FIG. 2 is a plan view showing a vehicle body lower structure 12 of the vehicle 10 according to the embodiment. FIG. 3 is a plan view showing a state in which a case cover 54 is removed from a battery pack 28 of the vehicle body lower structure 12 according to the embodiment.

As shown in FIG. 1 to FIG. 3, as the vehicle 10, for example, while an electric automobile is exemplified, a configuration of the present invention may be applied to other vehicles such as a hybrid automobile or the like.

The vehicle 10 includes the vehicle body lower structure 12 that constitutes a skeleton section or the like of a lower section of the vehicle body. The vehicle body lower structure 12 includes a left side sill 14 and a right side sill 14, a floor panel 16 that bridges between the left and right side sills 14, and a plurality of floor cross members 34, 35 and 36 disposed on an upper surface side of the floor panel 16.

In addition, the vehicle body lower structure 12 includes the battery pack 28 disposed below the floor panel 16, side frames 38 and 39 configured to support the battery pack 28, and a battery 45 provided on the inside 49 of the battery pack 28.

Hereinafter, the side frame 38 is referred to as "a left side frame 38" and the side frame 39 is referred to as "a right side frame 39."

The left and right side sills 14 are disposed at left and right side portions of the vehicle 10 on a lower end side, and extend in the forward/rearward direction of the vehicle 10. The floor panel 16 forms a floor section of a passenger compartment by having both end portions in the vehicle width direction bridge between the left and right side sills 14.

The floor cross members 34, 35 and 36 extend in the vehicle width direction, and both end portions of the extension sections are coupled to the left and right side sills 14. The floor cross members 34, 35 and 36 are disposed to be separated from each other in a vehicle body forward/rearward direction.

In the vehicle 10, for example, a driver seat 31 and a passenger seat 32 installed in a passenger compartment are attached to the two floor cross members 34 and 35 of the vehicle body on a front side. In addition, a rear seat 33 installed in the passenger compartment is attached to the floor cross member 36 of the vehicle body on a rear side.

The battery pack 28 bridge between the left side sill 14 and the right side sill 14 in between the left side sill 14 and the right side sill 14, and the battery pack 28 is provided below the floor panel 16. For example, an intelligent power unit (IPU) or the like is included in the battery pack 28. The IPU is obtained by integrating a power control unit (PCU) configured to control selection of a drive mode or deceleration regeneration according to traveling circumstances and a battery residual quantity of the vehicle 10 and the battery 45.

The battery pack 28 includes a battery case (a case) 41, a plurality of case cross members (cross members) 42, 43 and 44, a plurality of support brackets 48 and the battery 45 (i.e., a plurality of cells 46).

Figure 4:
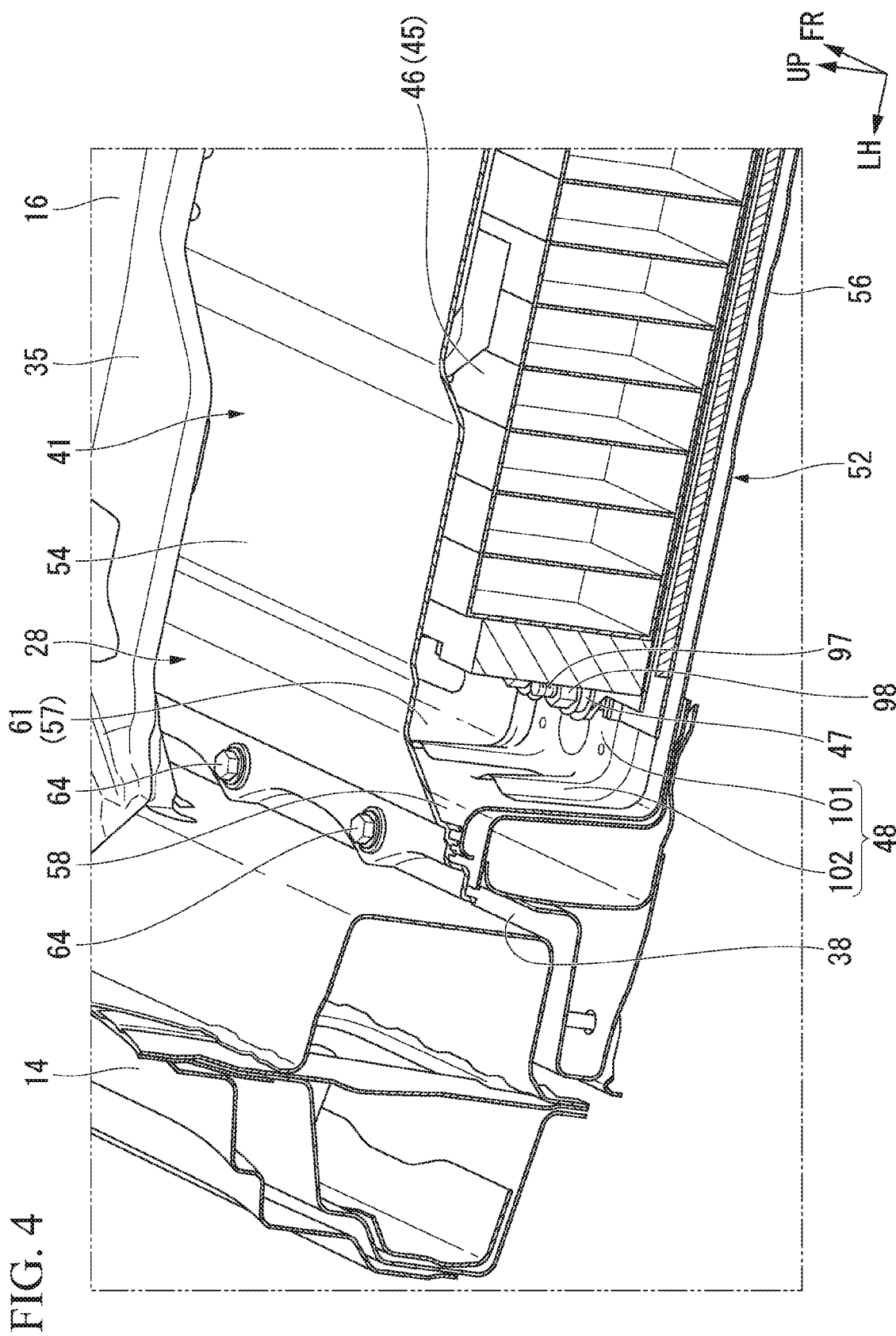
FIG. 4 is a cross-sectional view of the vehicle body lower structure according to the embodiment of the present invention taken along line IV-IV in FIG. 2.

The battery case 41 includes a case main body 52 and the case cover 54 (see FIG. 4). The case main body 52 has a case bottom section 56, a case circumferential wall 57 and a case overhanging section 58. The case circumferential wall 57 stands upward from a circumferential edge of the case bottom section 56, and has a left sidewall section (a longitudinal wall section) 61 and a right sidewall section (a longitudinal wall section) 62.

The case overhanging section 58 overhangs from an upper side of the case circumferential wall 57 toward an outer side of the battery case 41.

The left sidewall section 61 and the right sidewall section 62 are laterally symmetrical members, and hereinafter, the left sidewall section 61 will be described in detail and detailed description of the right sidewall section 62 will be omitted.

Figure 5:
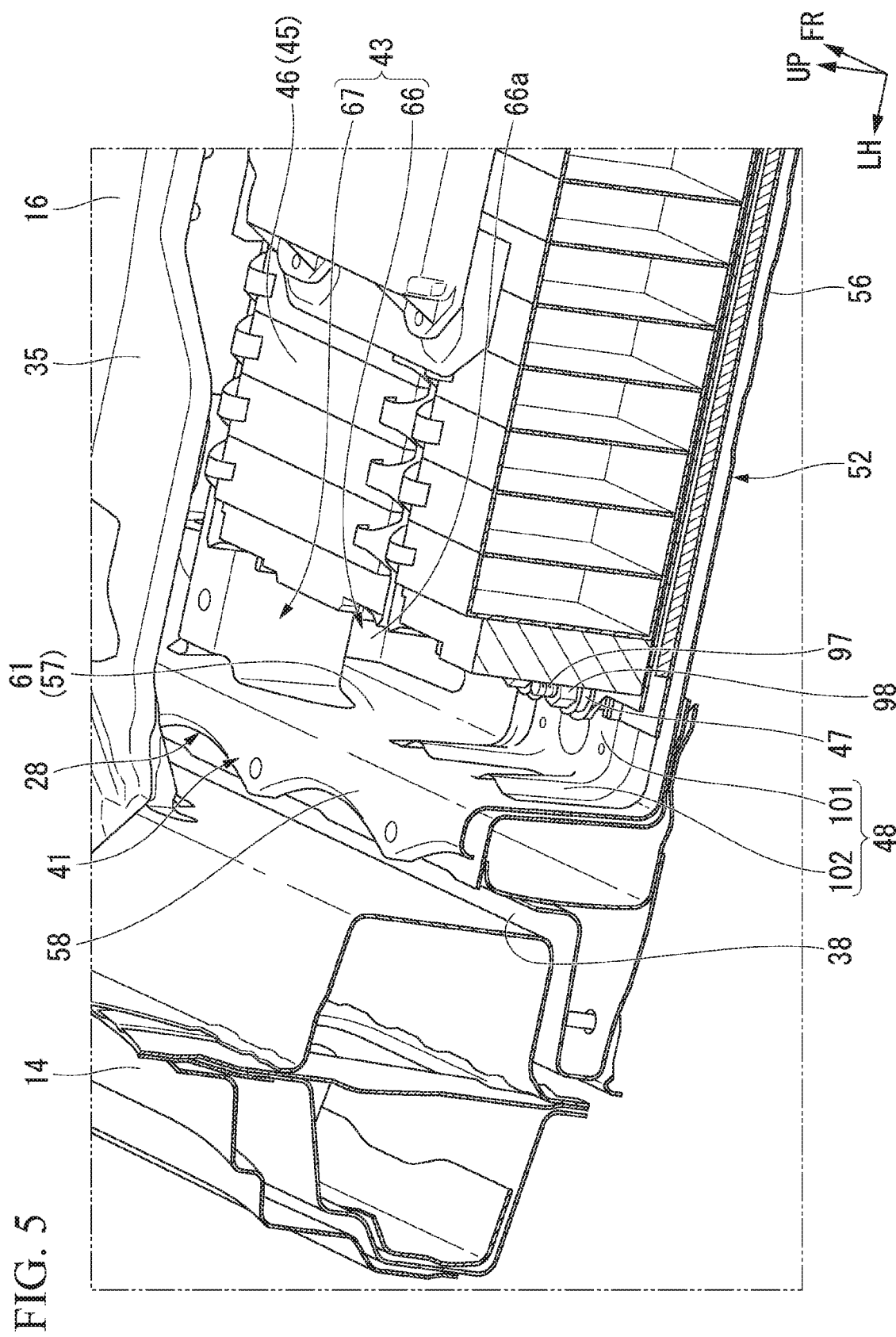
FIG. 5 is a cross-sectional view showing a state in which the case cover is removed from the vehicle body lower structure in FIG. 4 according to the embodiment of the present invention.

FIG. 4 is a cross-sectional view of the vehicle body lower structure 12 according to the embodiment taken along line IV-IV in FIG. 2. FIG. 5 is a cross-sectional view showing a state in which the case cover 54 is removed from the vehicle body lower structure 12 according to the embodiment.

As shown in FIG. 4 and FIG. 5, the left sidewall section 61 of the case circumferential wall 57 is disposed inside the left side sill 14 in the vehicle width direction, and extends along the left side sill 14 in the vehicle body forward/rearward direction. The left side frame 38 is fixed along the left sidewall section 61 of the case circumferential wall 57. The left side frame 38 extends in the vehicle body forward/rearward direction from a left outer side of the battery pack 28 in the vehicle width direction. The left side frame 38 is attached to the left side sill 14.

That is, the left sidewall section 61 of the case circumferential wall 57 is supported by the left side sill 14 via the left side frame 38.

As shown in FIG. 3 and FIG. 4, the right sidewall section 62 of the case circumferential wall 57 is disposed inside the right side sill 14 in the vehicle width direction, and extends along the right side sill 14 in the vehicle body forward/rearward direction. Like the left sidewall section 61, the right sidewall section 62 of the case circumferential wall 57 is supported by the right side sill 14 (see FIG. 2) via the right side frame 39. The right side frame 39 is formed to be substantially symmetrical to the left side frame 38.

In this way, the left sidewall section 61 is attached to the left side sill 14 (see FIG. 2) via the left side frame 38, and the right sidewall section 62 is attached to the right side sill 14 via the right side frame 39.

The case cover 54 is attached to the case overhanging section 58 of the case main body 52 by a plurality of bolts 64 and nuts. The battery case 41 is formed in a box shape by the case main body 52 and the case cover 54. The battery case 41 is disposed below the floor panel 16 (see FIG. 2). The battery case 41 is supported by the left side sill 14 via the left side frame 38, and supported by the right side sill 14 via the right side frame 39 (see FIG. 2).

The plurality of case cross members 42, 43 and 44 are provided on the inside 49 of the case main body 52 (i.e., the inside 49 of the battery case 41). The case cross members 42, 43 and 44 are disposed at intervals in the vehicle body forward/rearward direction in the inside 49 of the case main body 52, and extend in the vehicle width direction. The case cross members 42, 43 and 44 have outer end portions in the vehicle width direction that are fixed to the left sidewall section 61 and the right sidewall section 62 of the case main body 52.

The case cross members 42, 43 and 44 are similar members, and hereinafter, the case cross member 43 will be described in detail and detailed description of the case cross members 42 and 44 will be omitted.

In the battery pack 28, the battery 45 is accommodated in the inside 49 of the battery case 41. The battery 45 includes the plurality of cells 46 provided in a space between the case cross members 42, 43 and 44.

For example, an intelligent power unit (IPU) or the like is included in the battery pack 28. The IPU is obtained by integrating a power control unit (PCU) configured to control selection of a drive mode or deceleration regeneration according to a traveling circumstance and a battery residual quantity of the vehicle 10 and the battery 45.

Figure 6:
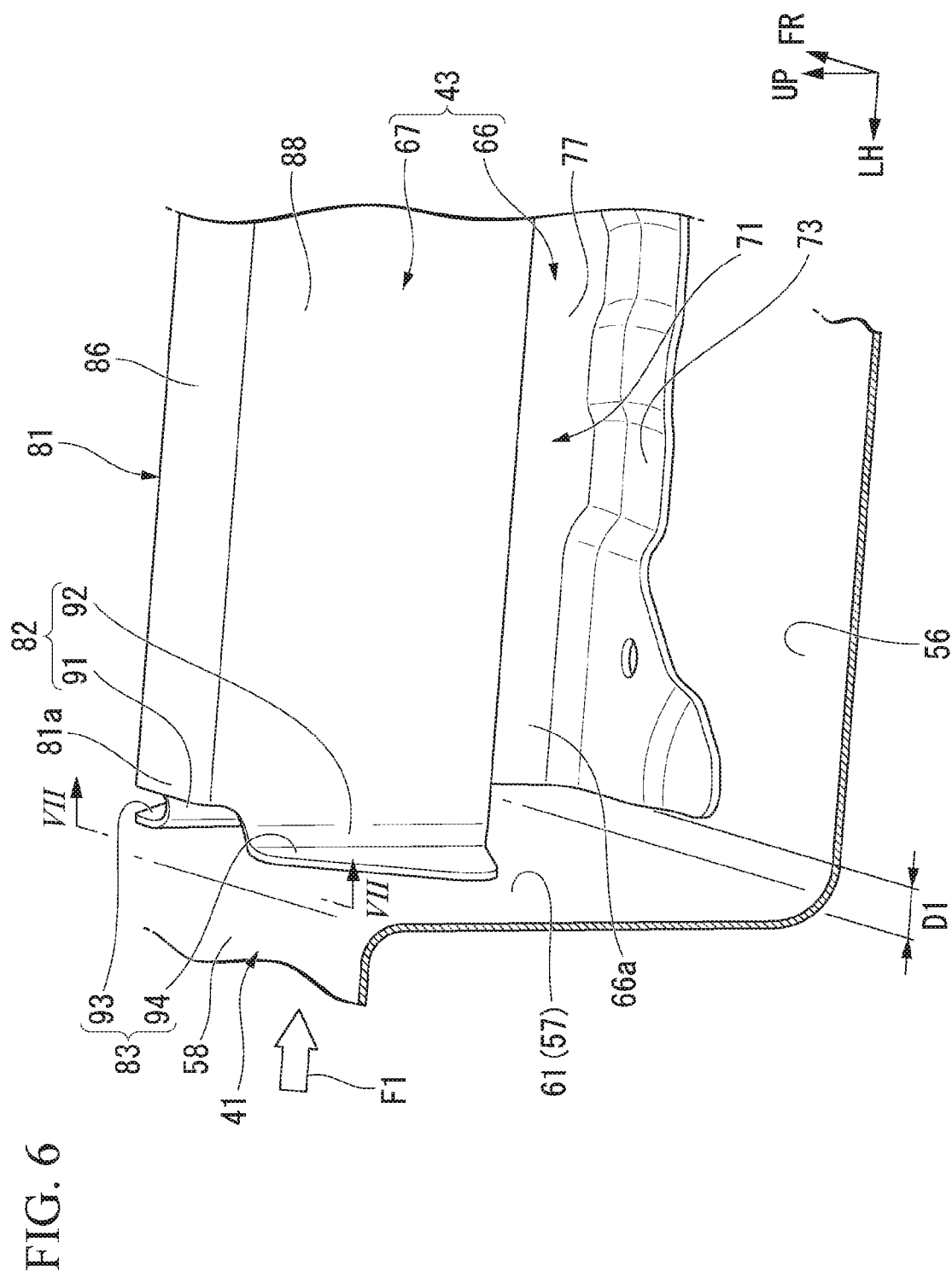
FIG. 6 is a perspective view showing a case cross member of the battery pack according to the embodiment of the present invention.
Figure 7:
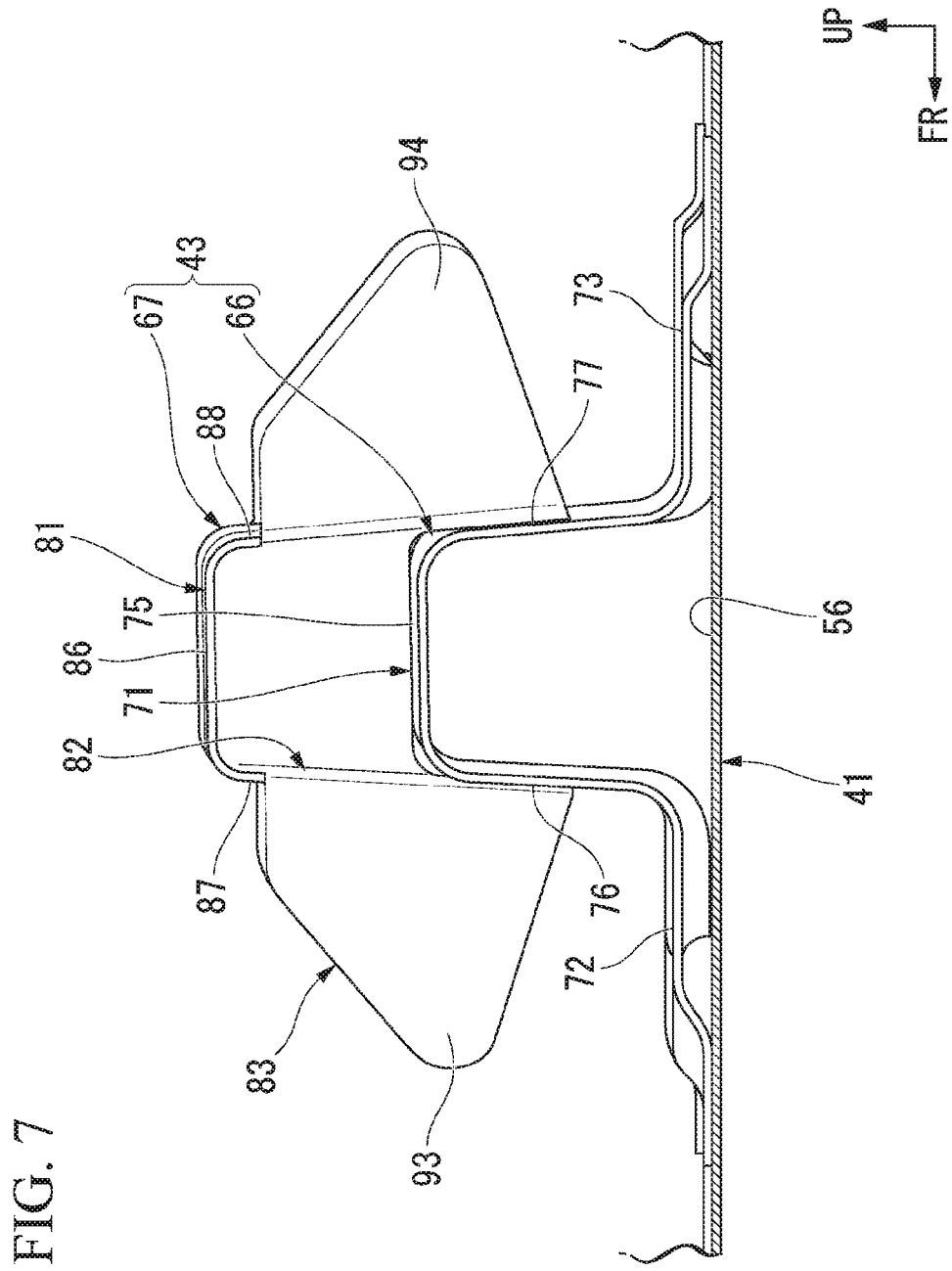
FIG. 7 is a cross-sectional view of the battery pack according to the embodiment of the present invention taken alone line VII-VII in FIG. 6.

FIG. 6 is a perspective view showing the case cross member 43 of the battery pack 28 according to the embodiment. FIG. 7 is a cross-sectional view of the battery pack 28 according to the embodiment taken along line VII-VII in FIG. 6.

As shown in FIG. 6 and FIG. 7, the case cross member 43 includes at least two members of a first cross member 66 and a second cross member 67. The first cross member 66 has a first protruding section 71, a first front overhanging section 72 and a first rear overhanging section 73.

The first protruding section 71 has a first apex section 75, a first front wall 76 and a first rear wall 77. The first apex section 75 is disposed along the case bottom section 56 above the case bottom section 56.

The first front wall 76 extends downward from a front side of the first apex section 75 to the case bottom section 56.

The first rear wall 77 extends downward from a rear side of the first apex section 75 to the case bottom section 56.

The first protruding section 71 is formed in a U shape by the first apex section 75, the first front wall 76 and the first rear wall 77.

The first front overhanging section 72 overhangs from a lower side of the first front wall 76 toward a front side of the vehicle body along an inner surface of the case bottom section 56. The first rear overhanging section 73 overhangs from a lower side of the first rear wall 77 toward a rear side of the vehicle body along the inner surface of the case bottom section 56.

The first front overhanging section 72 and the first rear overhanging section 73 are joined to the inner surface of the case bottom section 56 by fastening members (for example, a bolt and a nut), or through spot welding. That is, the first cross member 66 is joined to the case bottom section 56 while extending in the vehicle width direction.

The first cross member 66 has a first left end portion (an outer end portion) 66a that is disposed at an interval D1 from the left sidewall section 61 of the battery case 41. In addition, like the first left end portion 66a, a first right end portion of the first cross member 66 is disposed with respect to the right sidewall section 62 (see FIG. 3) of the battery case 41 with the interval D1 (see FIG. 3).

The second cross member 67 is fitted onto the first protruding section 71 of the first cross member 66 from above. The second cross member 67 has a second protruding section 81, a second left weak section (a cross member weak section) 82, a second left joining section (an outer end portion) 83, a second right weak section (a cross member weak section) 84 (see FIG. 3), and a second right joining section (an outer end portion) 85 (see FIG. 3).

The second protruding section 81 has a second apex section 86, a second front wall 87 and a second rear wall 88. The second apex section 86 is disposed along the first apex section 75 above the first apex section 75. The second front wall 87 extends downward from a front side of the second apex section 86 to the first front wall 76 along the first front wall 76. The second rear wall 88 extends downward from a rear side of the second apex section 86 along the first rear wall 77 until the middle of the first rear wall 77.

The second protruding section 81 is formed in a U shape by the second apex section 86, the second front wall 87 and the second rear wall 88. The second protruding section 81 is fitted onto the first protruding section 71 of the first cross member 66 from above.

In the second protruding section 81, a second left end portion 81a is disposed further leftward (outward) in the vehicle width direction than the first left end portion 66a while having an interval from the left sidewall section 61 of the battery case 41. That is, the second left end portion 81a of the second protruding section 81 is interposed between the first left end portion 66a of the first cross member 66 and the left sidewall section 61 of the battery case 41.

In addition, like the second left end portion 81a, in the second protruding section 81, a second right end portion is disposed further leftward (outward) in the vehicle width direction than the first right end portion of the first cross member 66 while having an interval from the right sidewall section 62 of the battery case 41 (see FIG. 3). That is, like the second left end portion 81a, the second right end portion of the second protruding section 81 is interposed between the first right end portion of the first cross member 66 and the right sidewall section 62 of the battery case 41.

The second left weak section 82 is provided on the second left end portion 81a of the second protruding section 81 in the vehicle width direction.

The second left weak section 82 extends outward from the second left end portion 81a to the second left joining section (an outer end portion in the vehicle width direction) 83 in the vehicle width direction. That is, the second left weak section 82 is provided at the second cross member 67 on a side of the outer end portion 83 in vehicle width direction.

The second left weak section 82 has a left front weak section 91 and a left rear weak section 92. The left front weak section 91 is formed in, for example, a flat plate shape, and extends from a left side of the second front wall 87 in the vehicle width direction to the left sidewall section 61 of the battery case 41. The left rear weak section 92 is formed in, for example, a flat plate shape, and extends from a left side of the second rear wall 88 in the vehicle width direction to the left sidewall section 61 of the battery case 41.

The left front weak section 91 and the left rear weak section 92 are disposed in the vehicle width direction at intervals in the vehicle body forward/rearward direction. Accordingly, for example, the second left weak section 82 is formed to be able to be appropriately crushed by an impact load F1 generated due to a side collision in a leftward direction in the vehicle width direction.

The second left joining section 83 is provided on a left end portion of the second left weak section 82 in the vehicle width direction. The second left joining section 83 has a left front joining piece 93 and a left rear joining piece 94. The left front joining piece 93 overhangs from a left side of the left front weak section 91 in the vehicle width direction toward a front side of the vehicle body along the left sidewall section 61 of the battery case 41. The left front joining piece 93 is joined to the left sidewall section 61 of the battery case 41, for example, by fastening members (a bolt, a nut) or through welding.

The left rear joining piece 94 overhangs from a left side of the left rear weak section 92 in the vehicle width direction toward a rear side of the vehicle body along the left sidewall section 61 of the battery case 41. The left rear joining piece 94 is joined to the left sidewall section 61 of the battery case 41, for example, by fastening members (a bolt, a nut) or through welding.

When the left front joining piece 93 and the left rear joining piece 94 are joined to the left sidewall section 61 of the battery case 41, the second left joining section 83 is joined to the left sidewall section 61 of the battery case 41.

As shown in FIG. 3, the second right weak section 84 is a portion laterally symmetrical to the second left weak section 82, and detailed description thereof will be omitted. Like the second left weak section 82, for example, the second right weak section 84 is formed to be able to be appropriately crushed by the impact load F1 generated due to a side collision in a rightward direction in the vehicle width direction.

That is, the second cross member 67 has the second left weak section 82 and the second right weak section 84 provided on a side of an outer end portion in the vehicle width direction.

The second right joining section 85 is a portion laterally symmetrical to the second left joining section 83, and detailed description thereof will be omitted. Like the second left joining section 83, the second right joining section 85 is joined to the right sidewall section 62 of the battery case 41. In this way, the second left joining section 83 is joined to the left sidewall section 61 of the battery case 41, and the second right joining section 85 is joined to the right sidewall section 62 of the battery case 41. In this way, the second cross member 67 extends further outward in the vehicle width direction than the first cross member 66, and is fixed to the left sidewall section 61 and the right sidewall section 62 of the battery case 41.

Returning to FIG. 6 and FIG. 7, for example, the first cross member 66 is formed to have a larger plate thickness dimension than that of the second cross member 67. In addition, for example, the first cross member 66 is formed of a material (an ingredient) having a larger strength than that of the second cross member 67. Alternatively, for example, the first cross member 66 is formed in a shape having a higher rigidity than that of the second cross member 67. Accordingly, the first cross member 66 is set to have a larger strength (rigidity) than that of the second cross member 67.

In this way, the case cross member 43 is constituted by the first cross member 66 and the second cross member 67. In addition, the second cross member 67 extends further outward in the vehicle width direction than the first cross member 66. Further, only the second cross member 67 is fixed to the left sidewall section 61 and the right sidewall section 62 of the battery case 41.

Accordingly, in comparison with a case in which the two members of the first cross member 66 and the second cross member 67 are fixed to the left sidewall section 61 and the right sidewall section 62 of the battery case 41, the case cross member 43 can be appropriately crushed by the impact load F1 due to a side collision. Accordingly, the impact load F1 due to the side collision can be appropriately absorbed by the case cross member 43.

In addition, for example, when an excessive impact load F1 is input from a side of the vehicle body due to the side collision, deformation (displacement) of the left sidewall section 61 and the right sidewall section 62 of the battery case 41 can be minimized by the first cross member 66. Accordingly, deformation (displacement) of the cells 46 (i.e., the battery 45 (see FIG. 3) received in the battery case 41 can be minimized.

Further, the first cross member 66 is formed to have a larger strength than that of the second cross member 67. That is, the second cross member 67 can be appropriately easily crushed by the first cross member 66. Accordingly, the second cross member 67 can be appropriately crushed by the impact load F1 input from a side of the vehicle body due to the side collision, and a crush amount (i.e., a collision stroke) of the second cross member 67 can be appropriately secured by the first cross member 66.

Accordingly, the impact load F1 due to the side collision can be appropriately absorbed, and the impact load F1 cannot be transmitted to the cells 46 (the battery 45). That is, the cells 46 (the battery 45) can be secured with respect to the impact load F1 due to the side collision.

As shown in FIG. 3, the second left weak section 82 is provided on a second left end portion of the second cross member 67 in the vehicle width direction, and the second right weak section 84 is provided on a right end portion of the second cross member 67 in the vehicle width direction. Accordingly, the second cross member 67 can be actively (i.e., more appropriately) easily crushed by the impact load F1 input from a side of the vehicle body due to a side collision. Accordingly, a crush amount (i.e., a collision stroke) of the second cross member 67 can be more appropriately secured. Accordingly, the cells 46 (i.e., the battery 45) can be more appropriately protected from the impact load F1 due to the side collision.

The plurality of support brackets 48 are provided on the left sidewall section 61 and the right sidewall section 62 of the battery case 41. The support brackets 48 are provided between the case cross member 42 and the case cross member 43 in the vehicle body forward/rearward direction. In addition, the support brackets 48 are provided between the case cross member 43 and the case cross member 44 in the vehicle body forward/rearward direction.

The support bracket 48 of the left sidewall section 61 and the support bracket 48 of the right sidewall section 62 are laterally symmetrical members, and hereinafter, the support bracket 48 of the left sidewall section 61 will be described in detail and detailed description of the support bracket 48 of the right sidewall section 62 will be described.

Figure 8:
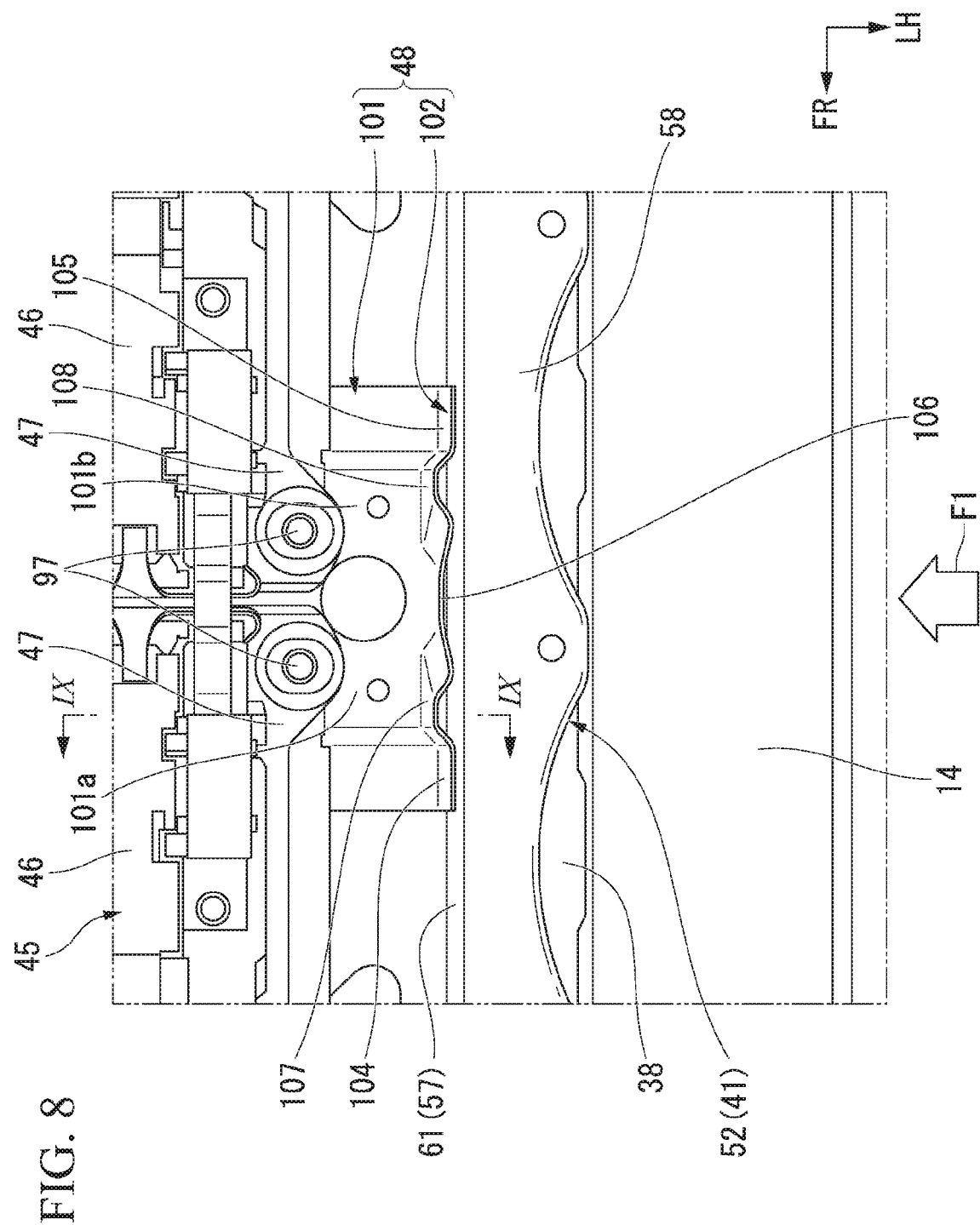
FIG. 8 is a plan view showing a state in which cells are supported by a support bracket of the battery pack according to the embodiment of the present invention.
Figure 9:
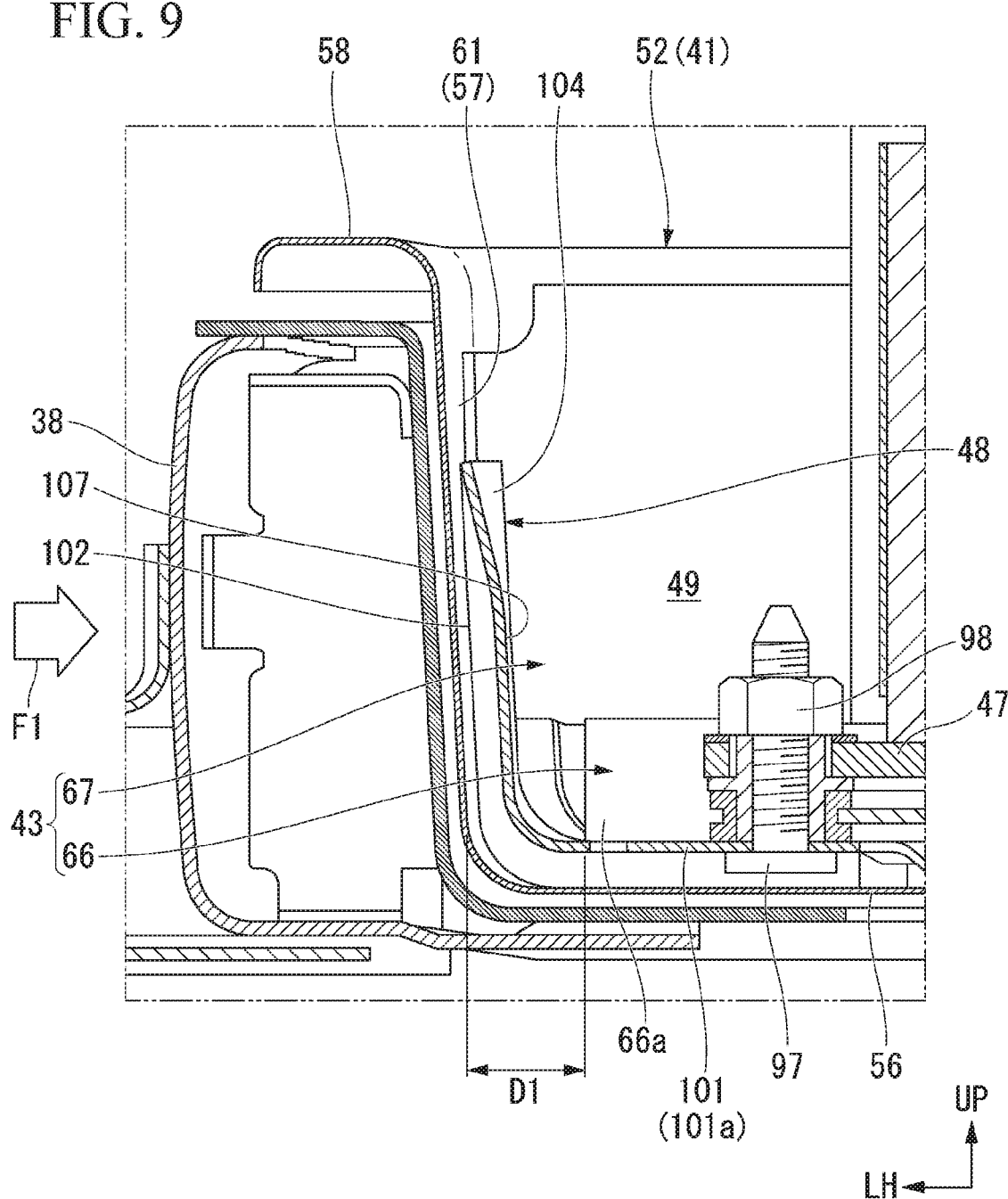
FIG. 9 is a cross-sectional view of the battery pack according to the embodiment of the present invention taken along line IX-IX in FIG. 8.

FIG. 8 is a plan view showing a state 4 in which the cells 46 are supported by the support brackets 48 of the battery pack 28 according to the embodiment. FIG. 9 is a cross-sectional view of the battery pack 28 according to the embodiment taken along line IX-IX in FIG. 8.

As shown in FIG. 8 and FIG. 9, the support brackets 48 has a first extension section 101 and a second extension section 102.

The first extension section 101 extends from the left sidewall section 61 of the battery case 41 toward an inner side in the vehicle width direction along the case bottom section 56 and is disposed inside the left sidewall section 61 in the vehicle width direction.

A cell bracket 47 is attached (fixed) to the first extension section 101 via, for example, a fastening member such as a bolt 97, a nut 98, or the like. The cell bracket 47 is a bracket configured to support the cells 46.

The second extension section 102 extends upward from an outer side of the first extension section 101 along the left sidewall section 61 of the battery case 41.

The second extension section 102 extends in the upward/downward direction inside the left side frame 38 in the vehicle width direction, and is fixed to the left sidewall section 61 of the battery case 41 through, for example, spot welding or the like.

In this way, the first extension section 101 of the support brackets 48 is fixed to the cell bracket 47 (i.e., the cells 46). In addition, the second extension section 102 is fixed to the left sidewall section 61 of the battery case 41. Accordingly, for example, vibrations applied to the cells 46 during traveling of the vehicle 10 can be transmitted to the battery case 41 via the support brackets 48. Accordingly, for example, vibrations of the cells 46 (i.e., the battery 45) of an inside 49 of the battery case 41 during traveling of the vehicle can be minimized.

In addition, when the first extension section 101 of the support bracket 48 is fixed to the cells 46 via the cell bracket 47 and the second extension section 102 is fixed to the left sidewall section 61 of the battery case 41, attachment strength of the cells 46 is improved.

Further, the second extension section 102 of the support bracket 48 is provided inside the left side frame 38 in the vehicle width direction. In addition, the second extension section 102 extends in the upward/downward direction. Accordingly, when the impact load F1 is input from a side of the vehicle body due to the side collision, a displacement amount in which the left side frame 38 is displaced toward the cells 46 can be minimized by the support brackets 48.

That is, support rigidity of the cells 46 (the battery 45) can be increased by the support brackets 48, and the cells 46 (the battery 45) can be appropriately protected from the impact load F1 due to the side collision.

Figure 10:
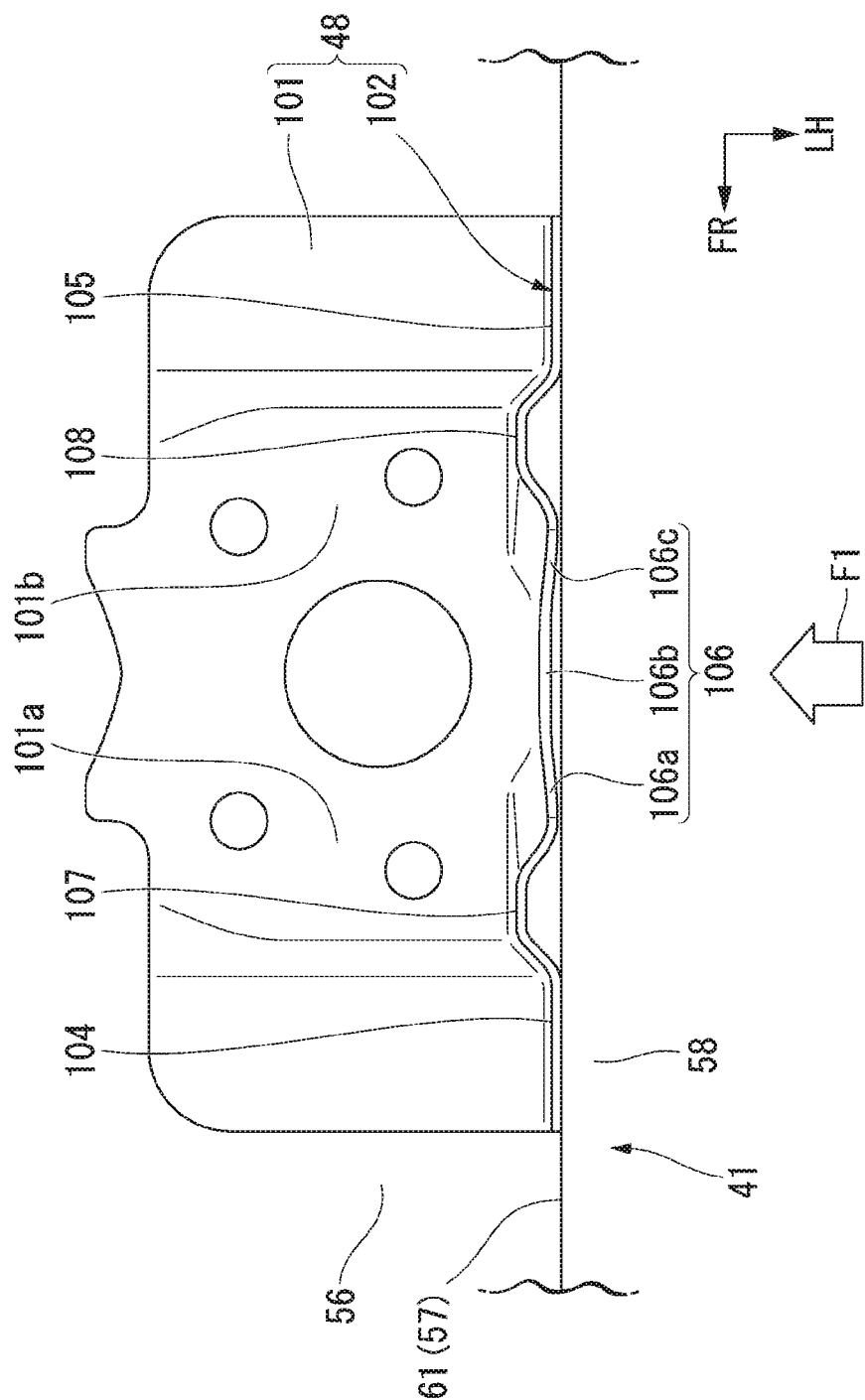
FIG. 10 is a plan view showing the support bracket according to the embodiment of the present invention.
Figure 11:
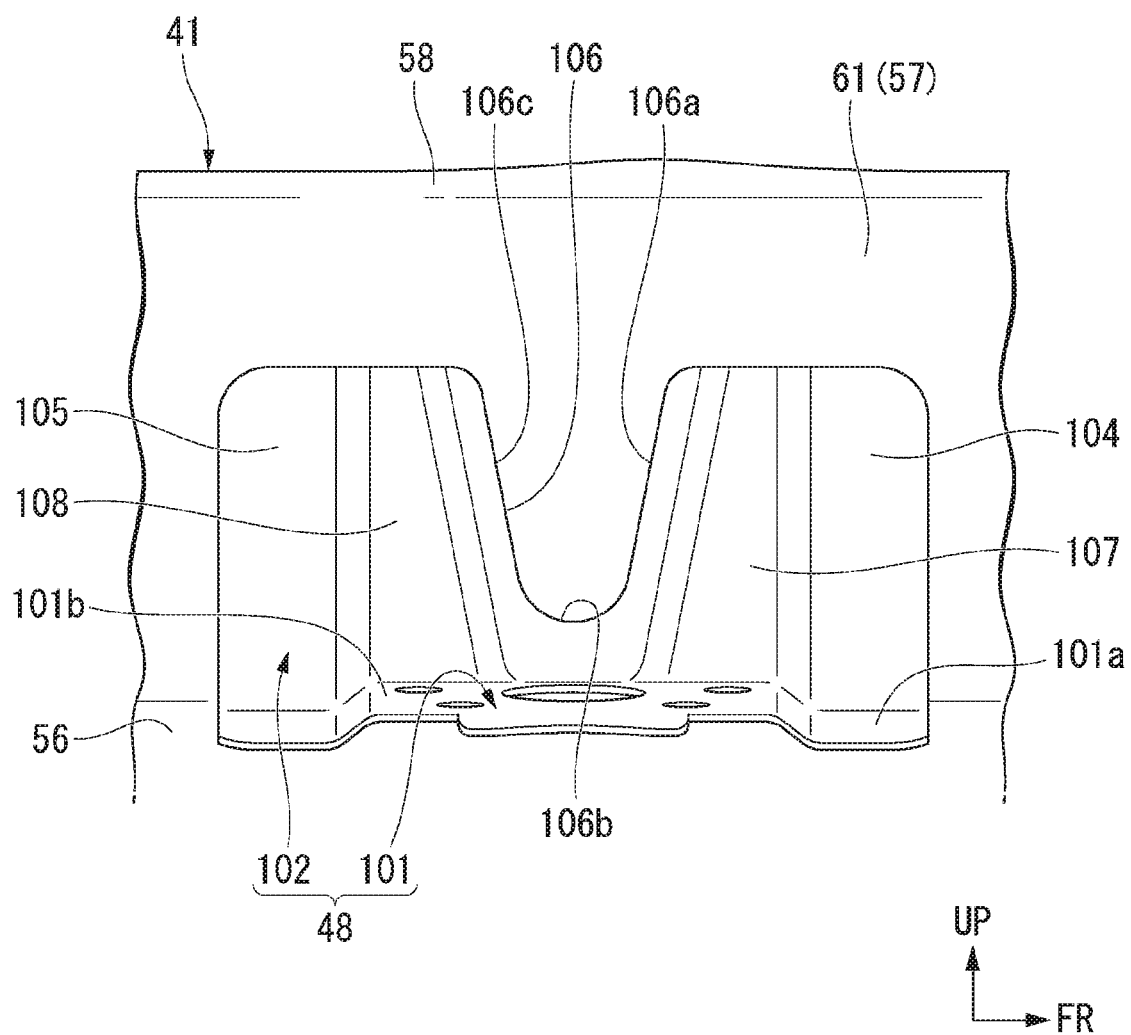
FIG. 11 is a plan view showing the support bracket according to the embodiment of the present invention.

FIG. 10 is a plan view showing the support bracket 48 according to the embodiment. FIG. 11 is a side view showing the support bracket 48 according to the embodiment.

As shown in FIG. 10 and FIG. 11, the second extension section 102 has a front protrusion section 104, a rear protrusion section 105, a first central weak section (a weak section) 106, a second front weak section (a weak section) 107 and a second rear weak section (a weak section) 108.

Among the first extension section 101, the front protrusion section 104 extends upward from an outer side of a front half section 101*a* in a forward direction of the vehicle body along the left sidewall section 61 of the battery case 41, and is fixed to the left sidewall section 61 through spot welding or the like.

Among the first extension section 101, the rear protrusion section 105 extends upward from an outer side of a rear half section 101*b* in a rearward direction of the vehicle body along the left sidewall section 61 of the battery case 41, and is fixed to the left sidewall section 61 through spot welding or the like.

A first central weak section 106 is formed between the front protrusion section 104 and the rear protrusion section 105. The first central weak section 106 is formed in a U-shaped groove form, an upper side of which is open, by a rear inclined side 106*a* of the front protrusion section 104, a bottom section 106*b*, and a front inclined side 106*c* of the rear protrusion section 105.

The second front weak section 107 is formed in the front protrusion section 104. The second front weak section 107 extends upward from a lower side to an upper side of the front protrusion section 104. Specifically, the second front weak section 107 is formed of a bead extending in the upward/downward direction and protruding from the front protrusion section 104 toward an inner side in the vehicle width direction in a U shape.

The second rear weak section 108 is formed in the rear protrusion section 105. Like the second front weak section 107, the second rear weak section 108 extends upward from a lower side to an upper side of the rear protrusion section 105.

Specifically, the second rear weak section 108 is formed of a bead extending in the upward/downward direction and protruding from the rear protrusion section 105 toward an inner side in the vehicle width direction in a U shape.

In the embodiment, while the example in which the beads of the second front weak section 107 and the second rear weak section 108 protrude toward the inner side in the vehicle width direction in the U shape have been exemplified, there is no limitation thereto. As another example, the beads of the second front weak section 107 and the second rear weak section 108 may be formed in another shape such as a V shape, a curved shape, or the like.

In this way, the first central weak section 106, the second front weak section 107 and the second rear weak section 108 are provided in the second extension section 102 of the support bracket 48. Accordingly, when the impact load F1 is input from a side of the vehicle body due to the side collision, the second extension section 102 can be appropriately crushed (deformed). Accordingly, the impact load F1 can be absorbed by the second extension section 102, and the cells 46 (the battery 45 (see FIG. 3)) in the battery case 41 can be protected.

In addition, the second front weak section 107 and the second rear weak section 108 are formed of the beads extending in the upward/downward direction. Accordingly, the second front weak section 107 and the second rear weak section 108 can be appropriately crushed by the impact load F1 from a side in the vehicle width direction. Accordingly, the impact load F1 due to the side collision can be appropriately absorbed by the second front weak section 107 and the second rear weak section 108, and the battery 45 (see FIG. 3) in the battery case 41 can be more appropriately protected.

In addition, when the second front weak section 107 and the second rear weak section 108 are formed of the beads extending in the upward/downward direction, rigidity of the second front weak section 107 and the second rear weak section 108 can be improved with respect to vertical vibrations due to the battery 45 (see FIG. 3). Accordingly, for example, vibrations in the upward/downward direction applied to the battery 45 during traveling of the vehicle 10 can be appropriately transmitted to the battery case 41 via the support bracket 48. Accordingly, vibrations of the cells 46 (i.e., the battery 45) of the inside 49 (see FIG. 3) of the battery case 41 can be appropriately minimized.

Further, as shown in FIG. 3, the support brackets 48 are provided between the case cross members 42, 43 and 44 in the vehicle body forward/rearward direction. Accordingly, when the portions of the battery case 41 between the case cross members 42, 43 and 44 are reinforced by the support brackets 48, rigidity of the portions between the case cross members 42, 43 and 44 can be secured. Accordingly, the number of the case cross members 42, 43 and 44 in the battery case 41 can be minimized to a small level, and a space of the inside 49 of the battery case 41 can be largely secured.

Accordingly, strength with respect to the impact load F1 due to the side collision can be improved in the portion in which the case cross members 42, 43 and 44 are not provided without decreasing the number of the cells 46 received in the inside 49 of the battery case 41.

Further, the technical scope of the present invention is not limited to the above-mentioned embodiment and various modifications may be made without departing from the scope of the present invention.

For example, in the embodiment, while the example in which the case cross member 43 is constituted by the two members of the first cross member 66 and the second cross member 67 has been described, it is not limited to the two members. As another example, when the case cross member 43 is constituted by a plurality of members other than the two members, the same effects as in the embodiment can also be obtained.

In addition, in the embodiment, while the example in which the first central weak section 106, the second front weak section 107 and the second rear weak section 108 are provided as weak sections in the second extension section 102 of the support bracket 48 has been described, there is no limitation thereto. As another example, for example, when the second front weak section 107 and the second rear weak section 108 are provided as weak sections, the same effects as in the embodiment can also be obtained.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body lower structure comprising:
a battery pack provided below a floor panel and in which a cell is received in an inside of a case;
a side frame extending in a vehicle body forward/rearward direction at an outer side of the battery pack in a vehicle width direction and configured to support the battery pack;
a support bracket having a first extension section that is fixed to the cell and that is disposed at an inner side in the vehicle width direction, and a second extension section that is fixed to a longitudinal wall section of the case and that is disposed at an outer side in the vehicle width direction; and
a plurality of cross members that extend in the vehicle width direction at inside of the case and in which outer end portions in the vehicle width direction are fixed to the case, wherein the support bracket is provided between the plurality of cross members in the vehicle body forward/rearward direction, and wherein the second extension section extends in an upward/downward direction at an inner side of the side frame in the vehicle width direction.

2. The vehicle body lower structure according to claim 1, wherein the support bracket has a weak section provided in the second extension section.

3. The vehicle body lower structure according to claim 2, wherein the weak section is formed of a bead extending in the upward/downward direction.

4. The vehicle body lower structure according to claim 1, wherein a cross member that extends in the vehicle width direction at inside of the case and in which an outer end portion in the vehicle width direction is fixed to the case is provided, the cross member is constituted by at least two members of a first cross member and a second cross member, and the second cross member extending further outward in the vehicle width direction than the first cross member is fixed to a longitudinal wall section of the case.

5. The vehicle body lower structure according to claim 4, wherein the first cross member has strength larger than that of the second cross member.

6. The vehicle body lower structure according to claim 4, wherein the second cross member has a cross member weak section provided on an outer end portion side in the vehicle width direction.

7. The vehicle body lower structure according to claim 5, wherein the second cross member has a cross member weak section provided on an outer end portion side in the vehicle width direction.

* * * * *